United States Patent
Park et al.

(10) Patent No.: US 12,253,202 B2
(45) Date of Patent: Mar. 18, 2025

(54) FLUID SILENCER

(71) Applicant: CENTER FOR ADVANCED META-MATERIALS, Daejeon (KR)

(72) Inventors: Jong Jin Park, Sejong-si (KR); Jun Hyuk Kwak, Sejong-si (KR); Hak Joo Lee, Daejeon (KR); Tae In Choi, Daejeon (KR); Min Seok Jung, Daejeon (KR)

(73) Assignee: CENTER FOR ADVANCED META-MATERIALS, Daejeon (KR)

( * ) Notice: Subject to any disclaimer, the term of this patent is extended or adjusted under 35 U.S.C. 154(b) by 425 days.

(21) Appl. No.: 17/621,222

(22) PCT Filed: Jun. 9, 2020

(86) PCT No.: PCT/KR2020/007450
§ 371 (c)(1),
(2) Date: Dec. 20, 2021

(87) PCT Pub. No.: WO2021/020719
PCT Pub. Date: Feb. 4, 2021

(65) Prior Publication Data
US 2022/0349509 A1   Nov. 3, 2022

(30) Foreign Application Priority Data

Jul. 31, 2019 (KR) .................. 10-2019-0092892

(51) Int. Cl.
*F16L 55/033* (2006.01)

(52) U.S. Cl.
CPC .................. *F16L 55/0332* (2013.01)

(58) Field of Classification Search
CPC ........... F16L 55/02736; F16L 55/02745; F16L 55/0279; F16L 55/033; F16L 55/0332;
(Continued)

(56) References Cited

U.S. PATENT DOCUMENTS 1,747,876 A  *  2/1930  Metzgar .................. F01N 1/083
                                                       89/14.4
2,216,653 A  *  10/1940  Sauer ........................ F01N 1/08
                                                       89/14.4
(Continued)

FOREIGN PATENT DOCUMENTS

CH           432147 A   *   3/1967
EP       0519888 A1   *  12/1992
(Continued)

OTHER PUBLICATIONS

Machine translation of CH-432147-A (Year: 1967).*
International Search Report for PCT/KR2020/007450 mailed Sep. 3, 2020 from Korean Intellectual Property Office.

*Primary Examiner* — Forrest M Phillips
*Assistant Examiner* — Jennifer B. Olson
(74) *Attorney, Agent, or Firm* — Revolution IP, PLLC

(57) ABSTRACT

A fluid silencer includes: an expansion pipe disposed on a pipe through which a fluid containing noise sources flows and having an accommodation space therein; a viscous fluid received in the accommodation space; a noise introducing member disposed between the pipe and the expansion pipe to seal the accommodation space and allowing the noise sources to be introduced into the accommodation space therethrough; at least one partition member disposed in the accommodation space and dividing the accommodation space in a flow direction of the fluid; multiple baffle members disposed on one surface of the partition member and forming multiple sound absorbing spaces into which the noise sources introduced into the accommodation space are dispersedly introduced; and an elastic member disposed between the partition member and the baffle members and contracted/expanded by the viscous fluid entering/leaving the sound absorbing spaces as the noise sources are introduced into the sound absorbing spaces.

5 Claims, 3 Drawing Sheets

(58) Field of Classification Search
CPC ............. F16L 55/0335; F16L 55/02727; F16L 55/02718; F16L 55/05; F16L 55/054; F16L 55/0336; F16L 55/0337; F16L 55/0338; F16L 55/04; F01N 1/08; F01N 1/06; F01N 1/088; F02M 35/1255; F02M 35/1261; F02M 35/1266; G10K 11/16; G10K 2210/112; G10K 2210/3224; F41A 21/30
USPC .......................... 181/233, 212, 264, 273, 223
See application file for complete search history.

(56) References Cited

U.S. PATENT DOCUMENTS

| | | | | |
|---|---|---|---|---|
| 3,776,365 | A * | 12/1973 | Richards | ................... F01N 1/10 |
| | | | | 181/256 |
| 5,145,026 | A * | 9/1992 | Wilder | .............. F16L 55/02772 |
| | | | | 181/266 |
| 5,809,770 | A | 9/1998 | Jahn | |
| 7,073,626 | B2 * | 7/2006 | Weinhold | ................ F01N 1/088 |
| | | | | 181/269 |
| 10,113,826 | B2 * | 10/2018 | Bray | ....................... F41A 21/30 |
| 2018/0149122 | A1 | 5/2018 | Hartmann | |

FOREIGN PATENT DOCUMENTS

| | | | |
|---|---|---|---|
| JP | 2002-266623 | A | 9/2002 |
| KR | 10-1999-0035833 | A | 5/1999 |
| KR | 10-2010-0116395 | A | 11/2010 |
| KR | 10-2017-0049098 | A | 5/2017 |

* cited by examiner

【FIG. 1】
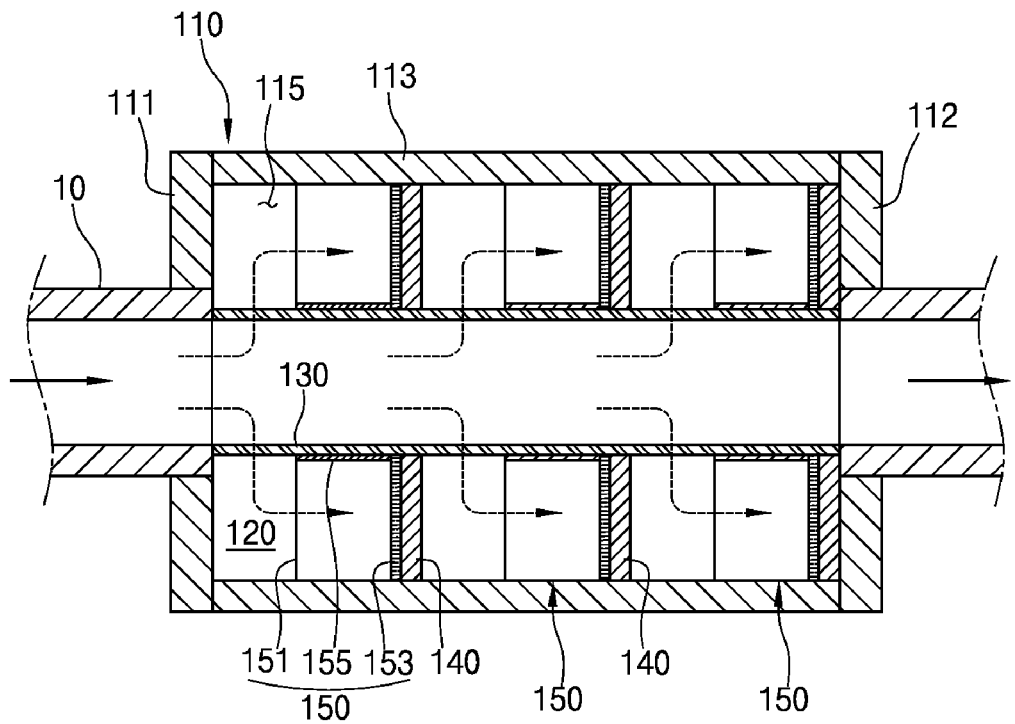
【FIG. 2】
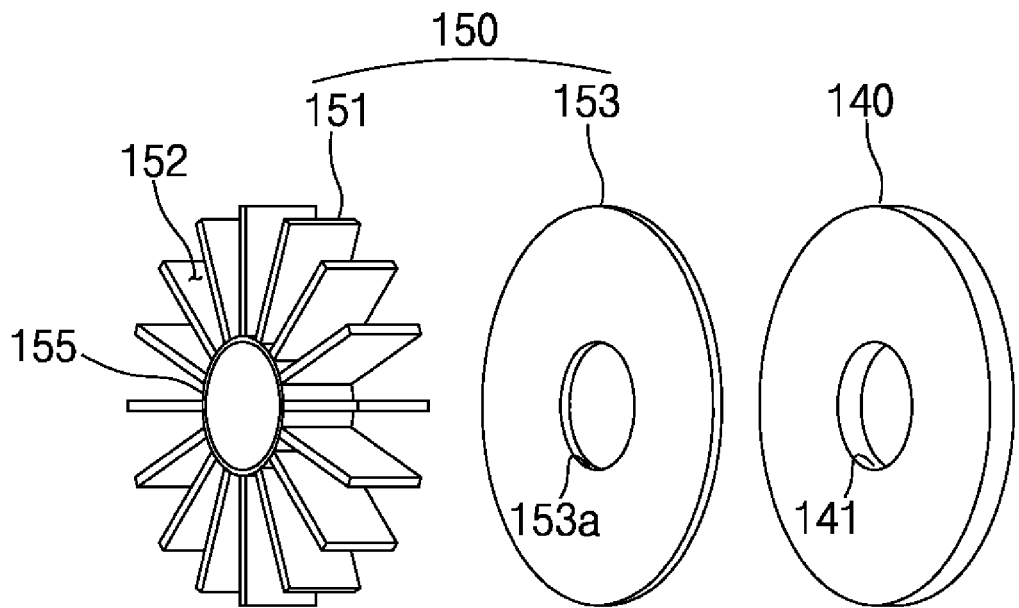

[FIG. 3]
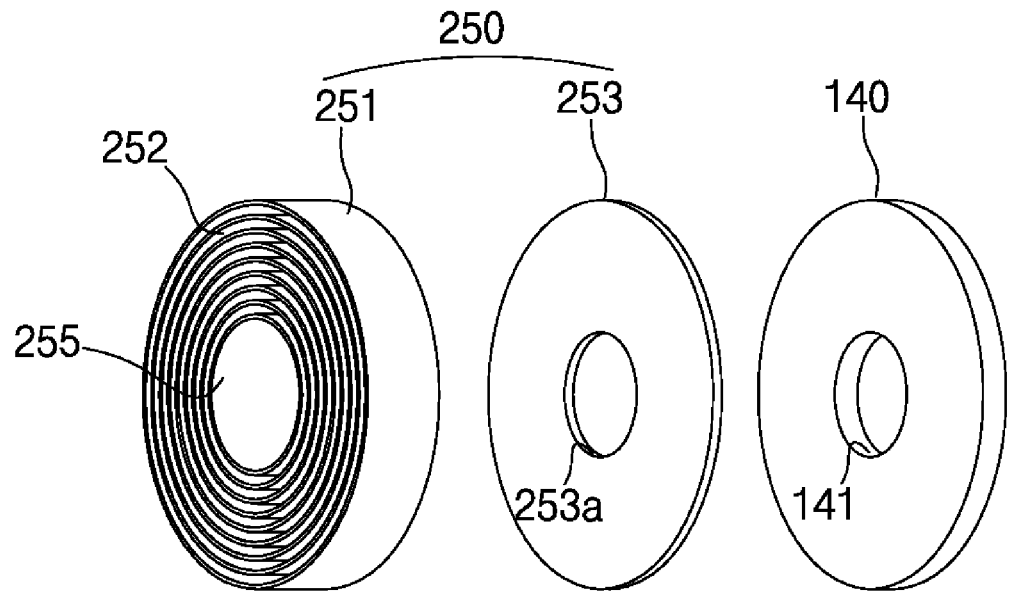
[FIG. 4]
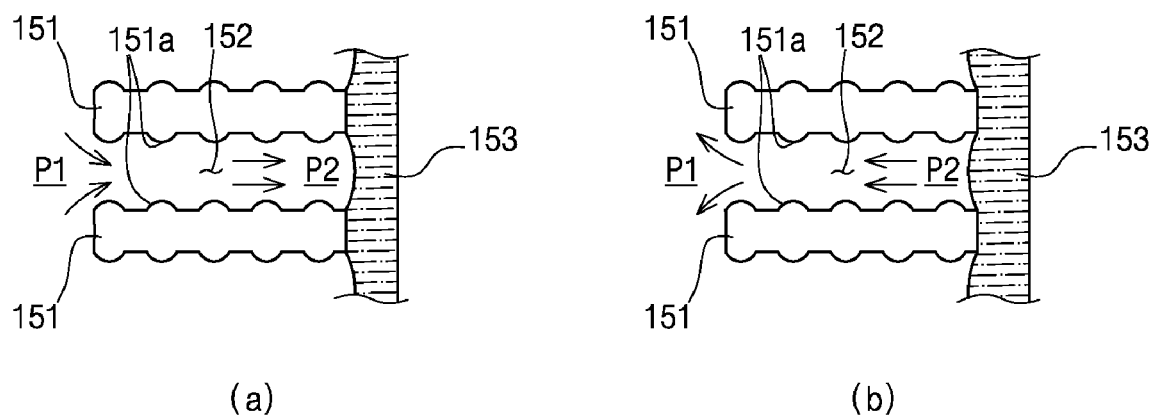
(a)　　　　　　　　　　　　(b)

[FIG. 5]
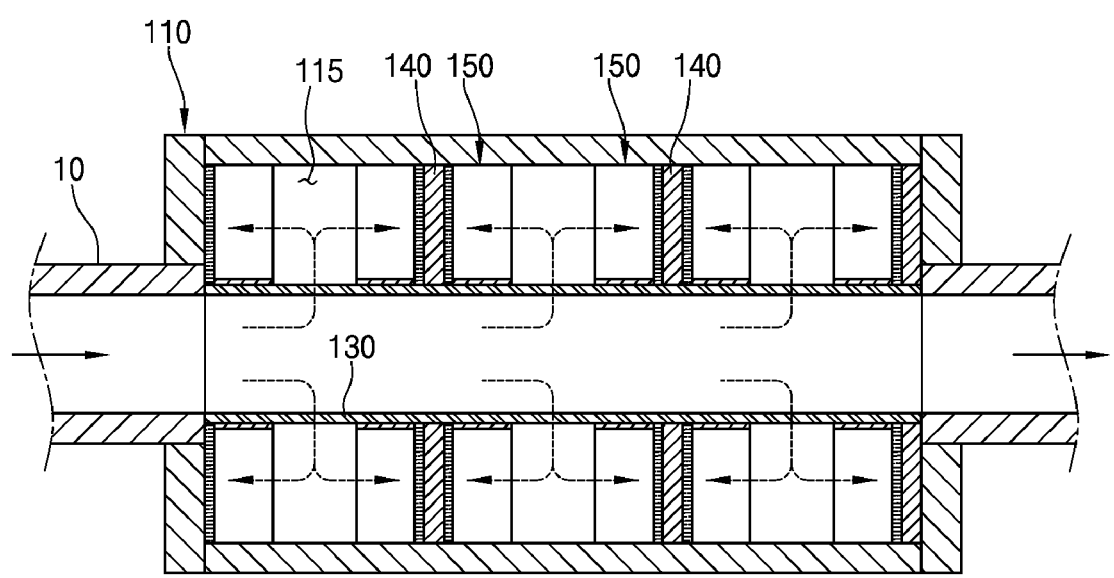

FLUID SILENCER

TECHNICAL FIELD

The present invention relates to a fluid silencer and, more particularly, to a fluid silencer that can minimize noise in a pipe through absorption of a noise source contained in a fluid flowing along the pipe.

BACKGROUND ART

A fluid such as a gas or a coolant used in driving of machinery such as vehicles and ships generates noise as the fluid is discharged outside through a pipe.

For example, such noise includes flow noise generated by fluid moving mechanisms, such as an engine and a pump, as well as fluid transfer noise generated as the fluid passes through valves or curved pipe sections.

In order to reduce such noise, there have been proposed a method of reducing a noise level of machinery's own noise source, such as an engine or a pump, and a method of reducing emission of noise using a silencer mounted on a pipe through which a noise source flows.

However, the former method has a problem in that reduction in noise level of machinery's own noise source is in direct connection with performance of the machinery. Accordingly, a fluid silencer is most preferred as a means for noise reduction.

There are several types of fluid silencers depending on noise reduction methods used. A representative example of fluid silencers is a simple expansion pipe-type fluid silencer that provides noise reduction using impedance mismatch due to a larger diameter thereof than a pipe through which the fluid passes.

However, despite ability to reduce noise in a wide range of frequencies, such a conventional expansion pipe-type fluid silencer is ineffective in sufficient noise attenuation to reduce noise in a specific frequency band and can interfere with a flow of the fluid passing through the pipe, thus causing increase in fluid noise.

In addition, there is a sound absorption silencer that reduces reflection of sound waves originating from a noise source through absorption of the noise source.

However, such a conventional sound absorption silencer has problems of increase in weight and increase in production and maintenance costs due to necessity to use a large amount of a thick and heavy sound absorbing material for efficient absorption of sound waves.

DISCLOSURE

Technical Problem

Embodiments of the present invention are conceived to solve such problems in the art and provide a small sized, lightweight fluid silencer which can maximize dissipation of sound energy through friction of a viscous fluid.

Technical Solution

In accordance with one aspect of the present invention, a fluid silencer includes: an expansion pipe disposed on a pipe through which a fluid containing noise sources flows and having an accommodation space therein; a viscous fluid received in the accommodation space; a noise introducing member disposed between the pipe and the expansion pipe to seal the accommodation space and allowing the noise sources to be introduced into the accommodation space therethrough; at least one partition member disposed in the accommodation space and dividing the accommodation space in a flow direction of the fluid; multiple baffle members disposed on one surface of the partition member and forming multiple sound absorbing spaces into which the noise sources introduced into the accommodation space are dispersedly introduced; and an elastic member disposed between the partition member and the baffle members and contracted/expanded by the viscous fluid entering/leaving the sound absorbing spaces as the noise sources are introduced into the sound absorbing spaces, whereby the noise sources are converted and dissipated into thermal energy due to friction between the viscous fluid and the baffle member.

In one embodiment, the fluid silencer may further include: a sleeve member disposed between the noise introducing member and the baffle members and preventing the noise sources having passed through the noise introducing member from being directly introduced into the sound absorbing spaces.

In one embodiment, the baffle members may be arranged radially around the noise introducing member such that the multiple sound absorbing spaces are formed in a circumferential direction of the accommodation space.

In another embodiment, the baffle members may have different diameters and may be arranged to be concentric with one another such that the multiple sound absorbing spaces are formed in a radial direction of the accommodation space.

In one embodiment, each of a pair of adjacent baffle members sharing a common sound absorbing space may have a friction surface contacting the viscous fluid, wherein the friction surface may be corrugated to increase a contact area with the viscous fluid.

In one embodiment, the friction surface may be corrugated in a travel direction of the noise sources entering/leaving the sound absorbing spaces.

In one embodiment, the baffle members and the elastic member may be disposed on front and rear surfaces of the partition member, respectively.

Advantageous Effects

With the baffle members forming multiple sound absorbing spaces into which noise sources are dispersedly introduced and the elastic member maximizing a pressure differential in the sound absorbing spaces, the fluid silencer according to the present invention can create a strong flow of the viscous fluid in the sound absorbing spaces, thereby maximizing dissipation of sound energy through viscous friction of the viscous fluid.

In addition, with the corrugations (alternating ridges and grooves) formed on the friction surface of the baffle member contacting the viscous fluid, the fluid silencer according to the present invention can enlarge an effective area of contact with the viscous fluid, thereby further increasing viscous friction of the viscous fluid.

Further, the fluid silencer according to the present invention can provide effective sound absorption without using a separate sound absorption material even when the volume of the accommodation space is relatively small, and thus can be manufactured in a small and compact form.

DESCRIPTION OF DRAWINGS

FIG. 1 is a sectional view of a fluid silencer according to one embodiment of the present invention.

FIG. 2 is a view of one embodiment of a noise reduction member shown in FIG. 1.

FIG. 3 is a view of another embodiment of the noise reduction member shown in FIG. 1.

FIG. 4 is a view illustrating the operating principle of the noise reduction member according to the present invention.

FIG. 5 is a sectional view of a fluid silencer according to another embodiment of the present invention.

BEST MODE

Hereinafter, exemplary embodiments of the present invention will be described in detail with reference to the accompanying drawings. It should be noted that like components will be denoted by like reference numerals throughout the specification and the accompanying drawings. In addition, description of details apparent to those skilled in the art will be omitted for clarity.

FIG. 1 is a sectional view of a fluid silencer according to one embodiment of the present invention, and FIG. 2 is a view of one embodiment of a noise reduction member shown in FIG. 1.

Referring to FIG. 1 and FIG. 2, the fluid silencer according to the present invention can effectively reduce noise sources in a pipe 10 through which a fluid containing the noise sources flows, and may include an expansion pipe 110, a viscous fluid 120, a noise introducing member 130, a partition member 140, and a noise reduction member 150.

The expansion pipe 110 may be disposed on the pipe 10 through which the fluid passes, and may have an accommodation space 115 formed therein and communicating with a flow path of the pipe 10.

The pipe 10 through which a fluid passes may be a pipe having a constant diameter, wherein the fluid may include a gas, a coolant, and the like.

The fluid flowing along the pipe 10 may contain a noise source generated by a machinery drive mechanism, such as an engine or a pump, and a fluid noise source generated as the fluid passes through various valves or curved pipe sections.

The expansion pipe 110 may be configured in the form of a pipe that is expanded to a larger diameter than the diameter of the pipe 10 through which the fluid passes.

In one embodiment, the expansion pipe 110 may include a flange-type front cover 111 connected to a front section of the pipe 10, a flange-type rear cover 112 connected to a rear section of the pipe 10, and an outer cover 113 connecting peripheries of the front cover 111 and the rear cover 112.

The expansion pipe 110 may be formed of the same material as the pipe 10, or may be formed of aluminum, steel, ceramic, or the like.

The viscous fluid 120 may be received in the accommodation space 115 of the expansion pipe 110.

The viscous fluid 120 includes a fluid having a high viscosity, preferably a fluid having a viscosity more than 10 times the viscosity of the fluid flowing through the pipe 10. For example, for the pipe 10 through which a coolant (water) flows, the viscous fluid 120 may be glycerin. It is known that water has a viscosity of 1.0087 cP at about 20° C. and glycerin has a viscosity of 1413.8 cP at about 20° C. Besides glycerin, silicone oil, grease, or the like may be used as the viscous fluid 220.

The noise introducing member 130 may be disposed between the pipe 10 and the expansion pipe 110 such that the accommodation space 115 of the expansion pipe 110 is sealed.

The noise introducing member 130 may connect the front section of the pipe 10 to the rear section of the pipe 10 with the fluid silencer placed between the front section of the pipe 10 and the rear section of the pipe 10. The noise introducing member 130 may have the same inner diameter as the pipe 10.

The noise introducing member 130 may be formed of an elastic material. For example, for the pipe 10 through which a coolant (water) flows, the noise introducing member 130 may be formed of a material having the same impedance as the coolant (water), specifically polyurethane.

The noise introducing member 130 allows noise sources in the pipe 10 to be introduced into the accommodation space 115 therethrough while preventing leakage of the viscous fluid 120 from the accommodation space 115 into the pipe 10 or to the outside.

The partition member 140 may be disposed inside the expansion pipe 110 to divide the accommodation space 115 in the expansion pipe 110 in a flow direction of the fluid.

The partition member 140 may have a central through-hole 141 coupled to a peripheral surface of the noise introducing member 130 and an outer peripheral surface coupled to the outer cover 113 of the expansion pipe 110.

The partition member 140 may be formed of, for example, a metal such as aluminum and steel, ceramic, or the like.

The partition member 140 may include multiple partition members spaced apart from one another in the flow direction of the fluid through the pipe 10. Here, the multiple partition members 140 may be arranged at equal intervals, or may be arranged at different intervals.

The noise reduction member 150 serves to substantially reduce noise through absorption of noise sources introduced into the accommodation space 115, and may include multiple baffle members 151 and an elastic member 153.

The baffle members 151 may be disposed on one surface of the partition member 140 to form multiple sound absorbing spaces 152 into which the noise sources introduced into the accommodation space 115 are dispersedly introduced.

As shown in FIG. 2, the noise reduction member 150 according to one embodiment may include multiple baffle members 151 arranged radially around the noise introducing member 130. Accordingly, multiple sound absorbing spaces 152 may be formed in a circumferential direction of the accommodation space 115.

As shown in FIG. 3, the noise reduction member 250 according to another embodiment may include multiple baffle members 251 having different diameters and arranged to be concentric with the noise introducing member 130. Accordingly, multiple sound absorbing spaces 252 may be formed in a radial direction of the accommodation space 115.

FIG. 4 is a view illustrating the operating principle of the noise reduction member according to the present invention.

Referring further to FIG. 4, each of a pair of adjacent baffle members 151 sharing a common sound absorbing space 152 has a friction surface 151a contacting the viscous fluid 120.

When a pulsed noise source is introduced into the sound absorbing space 152, there occurs a flow of the viscous fluid 120 entering/leaving a space between the pair of baffle members 151, that is, the sound absorbing space 152. The flow of the viscous fluid 120 causes the viscous fluid 120 to generate friction against the friction surface 151a of each of the pair of baffle members 151, eventually causing sound energy of the noise source to be converted and dissipated into thermal energy.

The friction surface 151a may be corrugated to have alternating ridges and grooves. The corrugated friction surface 151a has an increased contact area with the viscous fluid 120.

If the friction surface 151a is flat, the friction surface 151a offers relatively low friction due to a small effective area of contact with the viscous fluid 120, thus causing reduction in amount of sound energy converted into thermal energy.

Conversely, the corrugated friction surface 151a offers relatively high friction due to a large effective area of contact with the viscous fluid 120, thus causing increase in amount of sound energy converted into thermal energy.

The baffle member 151 may be formed of a metal, for example, stainless steel, copper, tungsten, or the like.

The friction surface 151a of the baffle member 151 may be formed to have directionality. Preferably, the friction surface 151a of the baffle member 151 is corrugated in a travel direction of the noise source entering/leaving the sound absorbing space 152. That is, due to a curved surface of the corrugated friction surface 151a defined by the alternating ridges and grooves, friction between the friction surface 151a and the viscous fluid 120 entering/leaving the sound absorbing space 152 can be further increased.

Referring back to FIG. 1 and FIG. 2, the fluid silencer according to the present invention may further include a sleeve member 155.

The sleeve member 155 may be disposed between the baffle members 151 and the noise introducing member 130 to prevent the noise source having passed through the noise introducing member 130 from being directly introduced into the sound absorbing space 152.

The sleeve member 155 may be wrapped around the noise introducing member 130. In addition, the sleeve member 155 may be integrally formed with the baffle member 151, and may be formed of the same material as the baffle member.

As shown in FIG. 1, the noise source inside the pipe 10 is not directly introduced into the sound absorbing space 152, which is a space between the baffle members 151. Instead, the noise source inside the pipe 10 is first introduced into the accommodation space 115 in front of the noise reduction member 150 due to the sleeve member 155 and then is introduced into the sound absorbing space 152 formed by the baffle members 151.

In this way, the sleeve member 155 guides the noise source to be first introduced into a region of the accommodation space 115, which is located in front of the noise reduction member 150 and is filled with only the viscous fluid 120, and then to be introduced into the sound absorbing space 152, thereby diverting and extending the travel path of the noise source in the accommodation space 115 and thus allowing improvement in sound absorption performance.

The elastic member 153 is disposed in the sound absorbing space 152, and may be contracted/expanded by the viscous fluid 120 that enters/leaves the sound absorbing space 152 as the noise source is introduced into the sound absorbing space 152.

The elastic member 153 may be disposed between the partition member 140 and the baffle members 151 to face the viscous fluid 120 entering/leaving the sound absorbing space 152.

In FIG. 2, reference numeral 153a denotes a coupling hole through which the noise introducing member 130 is coupled to the elastic member 153.

As described above, in order to convert a large amount of sound energy into thermal energy, it is necessary to maximize the flow of the viscous fluid 120 entering/leaving the sound absorbing space 152.

To this end, it is desirable that the elastic member 153 be designed to have a much lower modulus of elasticity than the viscous fluid 120.

When the elastic member 153 has a much lower modulus of elasticity than the viscous fluid 120, little or no resistance to the viscous fluid 120 occurs at an interface between the viscous fluid 120 and the elastic member 153, such that a pressure at the interface between the viscous fluid 120 and the elastic member 153 approaches zero regardless of the pressure of the viscous fluid 120.

Referring back to FIG. 4(a), when a pulsed sound is introduced into the accommodation space 115, a positive pressure may occur at a first position P1, which is an entrance of the sound absorbing space 152. In this case, a pressure at a second position P2, which is the interface between the viscous fluid 120 and the elastic member 153, is maintained near zero. This pressure differential between the entrance and an inner region of the sound absorbing space 152 creates a strong flow of the viscous fluid 120 from the entrance of the sound absorbing space 152 to the inner region of the sound absorbing space 152, in which the elastic member 153 is disposed.

Referring to FIG. 4(b), when a pulsed sound wave is introduced into the accommodation space 115, a negative pressure may occur at the first position P1, which is the entrance of the sound absorbing space 152. In this case too, a pressure at the second position P2, which is the interface between the viscous fluid 120 and the elastic member 153, is maintained near zero. This pressure differential between the entrance and the inner region of the sound absorbing space 152 creates a strong flow of the viscous fluid 120 from the inner region of the sound absorbing space 152, in which the elastic member 153 is disposed, to the entrance of the sound absorbing space 152.

Accordingly, as a pulsed sound is introduced into the accommodation space 115, the viscous fluid 120 in the sound absorbing space 152 formed by the baffle members 151 strongly flows back and forth between the entrance of the sound absorbing space 152 and the inner region of the sound absorbing space 152, in which the elastic member 153 is disposed.

Such a strong back and forth flow of the viscous fluid 120 causes high friction between the viscous fluid 120 and the friction surfaces 151a of the pair of baffle members 151 sharing a common sound absorbing space 152, thereby allowing a large amount of sound energy to be converted and dissipated into thermal energy.

In one embodiment, the elastic member 153 may include polyethylene foam. Polyethylene foam has a volumetric modulus of elasticity of 239.9 kPa and glycerin as the viscous fluid 120 has a volumetric modulus of elasticity of 4.35 MPa.

FIG. 5 is a sectional view of a fluid silencer according to another embodiment of the present invention.

Like the fluid silencer according to the above embodiment, the fluid silencer according to this embodiment may include the expansion pipe 110, the viscous fluid 120, the noise introducing member 130, the partition member 140, and the noise reduction member 150.

The fluid silencer according to this embodiment differs from the fluid silencer according to the above embodiment in that the noise reduction member 150 includes a pair of noise reduction members disposed on opposite front and rear surfaces of the partition member 140.

That is, a noise source introduced into each of the sections of the accommodation space 115 separated by the partition member 140 is introduced into each of the front noise reduction member 150 and the rear noise reduction member 150, thereby providing more effective sound absorption performance.

As described above, with the baffle members 151 or 251 forming multiple sound absorbing spaces 152 or 252 into which noise sources are dispersedly introduced and the elastic member 153 or 253 maximizing a pressure differential in the sound absorbing space 152 or 252, the fluid silencer according to the present invention can create a strong flow of the viscous fluid 120 in the sound absorbing space 152 or 252, thereby maximizing dissipation of sound energy through viscous friction of the viscous fluid 120.

In addition, with corrugations (alternating ridges and grooves) formed on the friction surface 151*a* of the baffle member 151 contacting the viscous fluid 120, the fluid silencer according to the present invention can enlarge an effective area of contact with the viscous fluid 120, thereby further increasing viscous friction of the viscous fluid 120.

Further, the fluid silencer according to the present invention can provide effective sound absorption without using a separate sound absorption material even when the volume of the accommodation space 115 is relatively small, and thus can be manufactured in a small and compact form.

Although some embodiments and modifications thereof have been described herein, it will be appreciated by those skilled in the art that various changes and modifications may be made to the details of the above-described embodiments without departing from the spirit and scope of the present invention as set forth in the following claims.

INDUSTRIAL APPLICABILITY

The present invention is industrially applicable to the field of fluid silencers adapted to minimize noise in a pipe through absorption of a noise source contained in a fluid flowing along the pipe.

The invention claimed is:

1. A fluid silencer comprising:
an expansion pipe disposed on a pipe through which a fluid containing noise sources flows and having an accommodation space therein;
a viscous fluid received in the accommodation space;
a noise introducing member disposed between the pipe and the expansion pipe to seal the accommodation space and allowing the noise sources to be introduced into the accommodation space therethrough;
at least one partition member disposed in the accommodation space and dividing the accommodation space in a flow direction of the fluid;
multiple baffle members disposed on one surface of the partition member and forming multiple sound absorbing spaces into which the noise sources introduced into the accommodation space are dispersedly introduced;
an elastic member disposed between the partition member and the baffle members and contracted/expanded by the viscous fluid entering/leaving the sound absorbing spaces as the noise sources are introduced into the sound absorbing spaces,
whereby the noise sources are converted and dissipated into thermal energy due to friction between the viscous fluid and the baffle member; and
a sleeve member having a cylindrical shape and being disposed between the noise introducing member and the baffle members and preventing the noise sources having passed through the noise introducing member from being directly introduced into the sound absorbing spaces,
wherein each baffle is located in a radial direction on an outer surface of the sleeve member having the cylindrical shape,
wherein each baffle member extends radially outward from the outer surface of the sleeve member as a single continuous structure, with each baffle member having a friction surface on both sides of the radially extending structure, the friction surface being corrugated to have alternating ridges and grooves to increase a contact area with the viscous fluid, wherein the friction surface is corrugated in a travel direction of the noise sources entering/leaving the sound absorbing spaces.

2. The fluid silencer according to claim 1, wherein the sleeve member is integrally formed with the baffle member.

3. The fluid silencer according to claim 1, wherein the baffle members are arranged radially around the noise introducing member such that the multiple sound absorbing spaces are formed in a circumferential direction of the accommodation space.

4. The fluid silencer according to claim 1, wherein the baffle members have different diameters and are arranged to be concentric with one another such that the multiple sound absorbing spaces are formed in a radial direction of the accommodation space.

5. The fluid silencer according to claim 1, wherein the baffle members and the elastic member are disposed on rear surfaces of the partition member.

\* \* \* \* \*